March 3, 1970     E. H. DINGER     3,499,168
VOLTAGE REGULATING CIRCUIT WITH REACTOR SENSING MEANS
Original Filed June 14, 1966     2 Sheets-Sheet 1

INVENTOR.
EDWARD H. DINGER
BY
HIS ATTORNEY

March 3, 1970   E. H. DINGER   3,499,168
VOLTAGE REGULATING CIRCUIT WITH REACTOR SENSING MEANS
Original Filed June 14, 1966   2 Sheets-Sheet 2

INVENTOR.
EDWARD H. DINGER
BY *Stanley C Corwin*
HIS ATTORNEY

United States Patent Office 3,499,168
Patented Mar. 3, 1970

3,499,168
VOLTAGE REGULATING CIRCUIT WITH REACTOR SENSING MEANS
Edward H. Dinger, Waynesboro, Va., assignor to General Electric Company, a corporation of New York
Continuation of application Ser. No. 557,522, June 14, 1966. This application July 31, 1968, Ser. No. 755,760
Int. Cl. H02p 9/30, 11/06
U.S. Cl. 322—28           30 Claims

ABSTRACT OF THE DISCLOSURE

There is described a control circuit in which a pair of inductive reactors are used to establish the reference voltage level of the device being controlled and obtain a measure of the deviation of the voltage level. The periodic voltage being controlled is applied to both reactors to cause the first of these to be driven from a first known energy level to saturation, the transition establishing a reference voltage level. The first reactor will saturate at a phase angle in the half cycle of the periodic voltage depending upon the amplitude of the periodic voltage. Commencing with the phase angle at which the first reactor saturates, the second reactor receives exciting current from the periodic voltage for the remainder of the half cycle to obtain a measure of the deviation of the periodic voltage from the reference level. The error energy stored by the second reactor is applied during each second half cycle of the periodic voltage to a constant voltage load, the value of which determines the error amplification factor of the control circuit.

This application is a continuation of my copending application Ser. No. 557,522, filed June 14, 1966, now abandoned.

My invention relates to regulating circuits and, more specifically, to regulating circuits utilizing an inductive reactor.

In a regulating circuit a comparison is made between a reference quantity and a regulated quantity to determine when an error has occurred in the development of the regulated quantity by a source. If an error has occurred, the regulated quantity is adjusted accordingly.

Thus, a reference circuit develops a constant reference quantity, and feedback circuits produce a signal which is indicative of the regulated quantity. A characteristic quantity of this feedback signal is compared with the reference quantity, and an error signal indicative of the difference between them is developed. The error signal is amplified and applied to the source which develops the regulated quantity to compensate for any error which has been detected.

It has been found that changes in ambient conditions of the regulating circuit change the parameters of the circuits described. These changes are reflected correspondingly as changes in the error signal, providing inaccurate adjustment of the regulated quantity. Many prior regulating circuits have been particularly sensitive to changes in their reference and detecting circuits caused by changes in the ambient temperature of the circuit elements. Regulating circuits which are relatively insensitive to thermal changes, such as those utilizing numerous heat sinks or precision made components, have been found to be more expensive to manufacture and maintain.

Therefore, it is an object of my invention to provide a regulating circuit having detecting circuit elements which are relatively insensitive to temperature changes.

Another source of inaccurate adjustment of the regulated quantity by a regulating circuit has been the delay between the occurrence of an error and the compensation for it. During this deley, changes may occur in the source which develops the regulated quantity. Therefore, the error signal may not bring about a proper adjustment for the actual conditions of the source when the signal is applied. For example, where the regulated quantity is a generated voltage, and an overvoltage is developed by the generator, the generator may be compensated for this overvoltage condition a few cycles after the overvoltage has been generated. In this time lapse, the generator may have begun to develop a voltage closer to the desired voltage level. Thus, the error signal may overcompensate the generator and an undervoltage may occur thereafter. The generator must then be compensated for the undervoltage condition. Quite obviously, such a delay in the regulating circuit can cause generator hunting whereby the generator voltage becomes unstable.

It is another object of my invention to provide an alternating current regulating circuit which will start to correct for errors in a generated voltage during the half cycle of the generated voltage after which they have been detected.

Another object of my invention is to provide a more stable regulating circuit.

In accordance with one aspect of my invention, a characteristic of a signal from a source is regulated by controlling the current flow through a gate controlled conducting device. A regulating circuit for controlling this current flow includes a saturable core reactor and a second reactor. The reference quantity for the regulating circuit is defined by the volt-second area of a signal which can change the direction of saturation of the saturable core reactor. After a change in the direction of saturation or the energization state of the saturable core reactor, the residual volt-second area of this signal changes the energization state of the second reactor as a function of the error in the regulated quantity. A current flow from the second reactor, as it returns to its original energization state, regulates the current flow through the gate controlled conducting device.

In accordance with another aspect of my invention which will become more apparent when the drawngs are discussed, the use of two reactors, one to define a reference quantity by the change in energization thereof between known levels, and the other to obtain a measure of the remainder of the energy left over, has application beyond that of a regulating circuit. The two reactors and the constant voltage load provided by the emitter-base diode of a transistor constitute an amplifier. The deviation of the periodic voltage applied to the two reactors from the reference level established by the first reactor is measured and stored by the second reactor and amplified with time through the transfer of this stored energy to the constant voltage load. The value of the constant voltage load determines the amplification factor of the amplifier.

The second reactor not only obtains the measure of the amount of variation of the periodic voltage from the reference level but also obtains an indication of the phase angle when the first reactor saturates. This phase angle of saturation is also amplified during the transfer of energy from the second reactor to the transistor.

It is accordingly another object of the present invention to provide a stable, fast-acting amplifier.

While the specification concludes with claims particularly pointing out and distinctly claiming the subject matter of this invention, the following description of the invention, taken in conjunction with the accompanying drawings, shall be referred to for a better understanding of the manner and process of making and using this invention.

Figure 1:
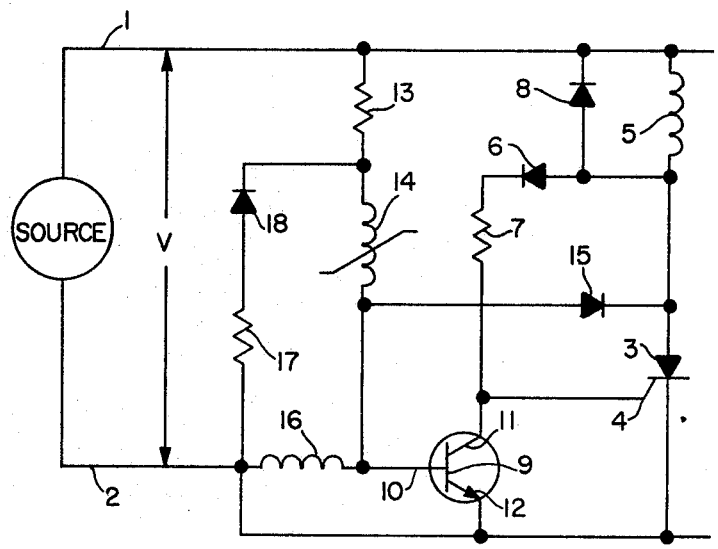
FIGURE 1 is a schematic diagram of a regulating circuit constructed in accordance with my invention.

While my invention is capable of numerous applications, FIGURE 1 shows an embodiment wherein it is used as a regulating circuit for the output voltage of an alternating current generator. In circuits of this type, an exciter winding or a generator field winding may be energized by the generator output voltage so as to maintain the output voltage at some constant level. Therefore, an output voltage V from the generator is applied across bus 1 and bus 2 and through a control rectifier 3, having a gate electrode 4, and to a generator field or exciter winding 5 in order to control the energization of this winding and in turn control the magnitude of the output voltage of the generator. A circuit comprising a rectifier 6 and a resistor 7 couples current from the anode electrode of the controlled rectifier 3 to its gate electrode 4. The impedance of the resistor 7 is relatively large so that any current flow therethrough does not appreciably affect the generator winding 5. A freewheeling rectifier 8 is connected across the generator winding 5 to provide a path for the generator winding current when the controlled rectifier 3 is nonconducting so that a reverse current does not flow through the generator winding.

The circuit which controls the conduction of the controlled rectifier 3 includes a transistor 9, having a base electrode 10, a collector electrode 11, and an emitter electrode 12. The collector 11 and the emitter 12 are connected in shunt with the gate-cathode junction of the controlled rectifier 3. When the transistor 9 conducts, it shunts the gate current from the controlled rectifier 3. As long as the transistor 9 conducts, the controlled rectifier has no gate current, and thus it cannot begin conducting.

The circuit means which control the state of conduction of the transistor 9 comprise a pair of inductive reactors which are used to measure an overvoltage condition of the voltage V applied across bus 1 and bus 2. At some time during any positive half cycle of the voltage V, when the voltage at bus 1 is positive in polarity with respect to that at bus 2, the controlled rectifier 3 becomes conducting and current flows through a resistor 13, a first reactor 14, and a rectifier 15. The reactor 14 comprises a saturable core reactor which is saturated in a first direction by the current flow during the positive half cycle of the generator output voltage V. During the subsequent negative half cycle of the voltage V, when the voltage at the bus 1 is negative in polarity with respect to that at the bus 2, current flows in the opposite direction through the resistor 13, the saturable reactor 14, and a second reactor 16. It also flows through a resistor 17 and a rectifier 18 which form a voltage divider with the resistor 13. The relative impedance of the resistor 13 and the combination of the resistor 17 and the rectifier 18 is such that a predetermined fraction of the output voltage V appears across the reactors 14 and 16 during any negative half cycle.

In this embodiment of my invention, the second reactor 16 is a linear reactor which requires a larger exciting current to energize it than does the saturable reactor 14. Therefore, while the impedance of the saturable reactor 14 is large as its core is being driven toward saturation in a second direction, the linear reactor 16 is substantially unaffected by the small current flow through the saturable reactor 14. The linear reactor 16 is excited by the larger current which flows after the saturable reactor 14 has been saturated in the second direction so that its impedance has decreased.

Figure 2:
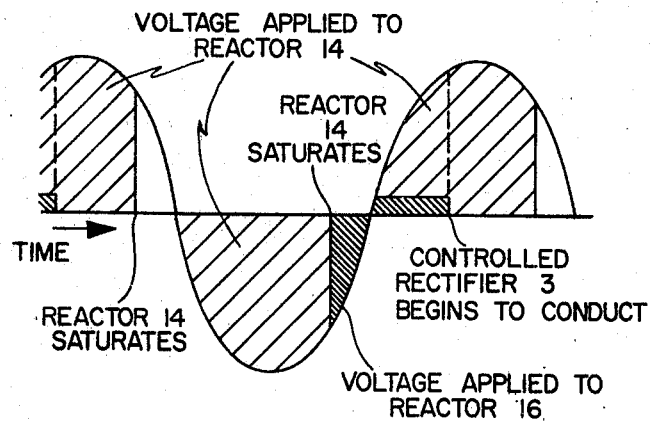
FIGURE 2 is a voltage diagram used to explain the operation of the circuit shown in FIGURE 1.

FIGURE 2 is referred to for further explanation of the operation of the regulating circuit described in conjunction with FIGURE 1. During a positive half cycle of the voltage V, the reactor 14 is energized by current which flows through the resistor 13, the reactor 14, and a composite current path including the diode 15, the linear reactor 16, and the base-emitter junction of the transistor 9. Prior to the point in the positive half cycle at which the controlled rectifier 3 becomes conducting, this current from the bus 1 through the resistor 13 and the reactor 14 passes through the parallel paths consisting of reactor 16 and the base-emitter junction of transistor 9 into bus 1. Beyond the point in the positive half cycle at which controlled rectifier 3 becomes conducting, this current flows through the resistor 13 and the reactor 14 through the parallel paths consisting of the reactor 16, the base-emitter junction of the transistor 9 and the rectifier 15 and controlled rectifier 3 in series into bus 1. The saturable reactor 14 saturates in a first direction toward the end of the positive half cycle. It is a purpose of the rectifier 15 to divert through the already conducting controlled rectifier 3 the major part of the resulting larger current which would in the absence of rectifier 15 flow into the base of transistor 9 and reactor 16 in parallel.

As noted above in FIGURE 2, the saturable reactor 14 saturates in a first direction before the end of a positive half cycle of the voltage V. It is essential that the saturable core reactor 14 be saturated or otherwise returned to a known energization state during each positive half cycle of the voltage V. This known energization state is used as a reference point from which an overvoltage error in the voltage V is measured. Therefore, the impedance of the resistor 13 is of a magnitude such that most of the positive half-cycle voltage is applied to the saturable reactor 14 until it saturates in the first direction.

During the next negative half cycle of the voltage V, the fraction of that voltage appearing across the resistor 17 and the forward biased rectifier 18 is applied across the reactors 14 and 16. The resulting current flow drives the core of the saturable reactor 14 toward excitation in the second direction. Since the linear reactor 16 requires a higher excitation current, it is substantially unaffected by the current flowing from the reactor 14 prior to the saturation of its core. The reactor 14 may be designed so that when the magnitude of the output voltage V is at the desired voltage, the core of the reactor 14 saturates in the second direction at a particular point in the negatve half cycle of the voltage wave. In a system having a substantially constant frequency, when the magnitude of the output voltage V is larger than the desired voltage level, the volt-second area of the fraction thereof applied to the reactor 14 increases. Thus, the core of the reactor 14 saturates sooner in the negtive half cycle of the voltage V. If the magnitude of the output voltage V is smaller than the desired voltage level, the volt-second area of the fraction applied to the reactor 14 decreases. Thus, the reactor 14 saturates its core later in the negative half cycle of the voltage. Regardless of the magnitude of the output voltage V, the direction of saturation of the reactor 14 can only be changed by a voltage having at least a particular volt-second area under its voltage wave.

After the core of the saturable core reactor 14 saturates in the second direction, the impedance of this reactor decreases. Thereafter, during this negative half cycle, as shown in FIGURE 2, the volt-second area of the output voltage wave V is applied across the reactor 16. Therefore, the current flow through the reactor 16 increases to a level sufficient to excite this reactor. At this time the reactor applies a negative voltage at the base 10 of the transistor 9 so that the transistor 9 is held not conducting. In addition, the collector-to-emitter voltage applied to transistor 9 is zero throughout the negative half cycle.

At the beginning of the subsequent positive half cycle of the voltage V, the excitation flux stored in the reactor 16 begins to return to the zero excitation level. Therefore, the reactor 16 begins to act like a voltage generator, generating a voltage which is positive in polarity at the base 10 of the transistor 9. Since this voltage forward biases the base-emitter junction of the transistor 9, a current from the reactor 16 flows therethrough to turn on the transistor 9. The base-emitter region of the transistor 9 limits the positive voltage generated by the reactor 16 and the lengthens or amplifies the time it takes for the reactor 16 to return to its zero excitation level. FIGURE 2 shows the constant voltage, discharge voltage wave of the voltage at the reactor 16. It should be noted that the area under this voltage wave is equal to the volt-second area of the voltage which had been applied to the reactor 16 during the preceding negative half cycle of the voltage V. Since the area of the voltage applied to the reactor 16 was a function of the magnitude of the output voltage V, the area under the volt-second area of the discharge voltage wave of the reactor 16 is also a function of the magnitude of the output voltage V. Since the discharge voltage level is substantially constant, the time it takes for the reactor 16 to discharge is a function of the magnitude of the output voltage V. Therefore, as the magnitude of the output voltage V increases, the reactor 16 discharges during a greater portion of the succeeding positive half cycle of the output voltage thereby keeping the transistor 9 turned on for a longer portion of the positive half cycle. As the magnitude of the output voltage V decreases, the reactor 16 discharges during a lesser portion of the succeeding positive half cycle, and the transistor 9 is turned on for a shorter time.

The generator field winding 5 is excited during each positive half cycle of the output voltage V by the current which flows through the controlled rectifier 3. This generator field winding 5 controls the magnitude of the output voltage V in accordance with its amount of excitation. Therefore as the portion of the positive half cycle of the output voltage V during which the rectifier 3 conducts increases, and more current flows through the controlled rectifier 3 during this half cycle, the magnitude of the output voltage V increases. Similarly, when the controlled rectifier 3 conducts for a smaller portion of this half cycle, the magnitude of the output voltage V decreases.

At the beginning of a positive half cycle, current attempts to flow through the generator field winding 5, the rectifier 6, the resistor 7, and the gate-cathode junction of the controlled rectifier 3 to turn on the controlled rectifier 3. However, if the transistor 9 begins to conduct due to the voltage generated at the reactor 16, the transistor 9 shunts the current from the gate-cathode junction of the controlled rectifier 3. While the transistor 9 is conducting, the controlled rectifier 3 cannot turn on. The resistor 7 limits the current flow through the transistor 9 when it is conducting. After the reactor 16 returns to its zero excitation level the base-emitter region of the transistor 9 is zero-biased so that the transistor 9 stops conducting. At this time gate current flows through the rectifier 6 and the resistor 7 and the gate-cathode junction of the controlled rectifier 3 to turn on the controlled rectifier 3. The generator field winding 5 is energized for the remaining portion of this positive half cycle of the output voltage V.

For the foregoing reasons, it can be seen that the volt-second area which a voltage must have to drive the core of a saturable reactor 14 from its first energization state to its second energization state is used as a reference quantity for the regulating circuit. Commencing with the phase angle of the voltage V at which reactor 14 saturates, the volt-second area of the voltage V in excess of this amount is applied to the reactor 16. During the succeeding positive half cycle of the output voltage V, the excitation level of the recator 16 determines the portion of the positive half cycle of the output voltage V which energises the generator field winding 5. Thus, the generator field winding 5 is excited as an inverse function of the magnitude of the output voltage V. It is apparent that when no overvoltage occurs, the reactor 16 is not excited, and thus the generator field winding 5 is energized during a full positive half cycle of the voltage V.

Figure 3:
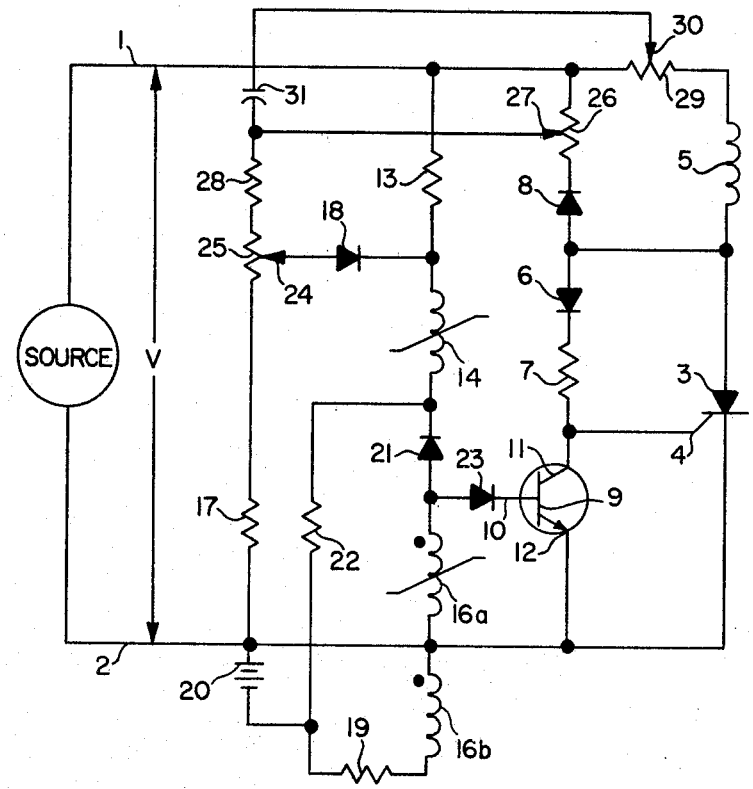
FIGURE 3 is a schematic diagram of a second embodiment of my invention using a pair of saturable core reactors in a regulating circuit.

FIGURE 3 shows another embodiment of my invention wherein the second reactor comprises a saturable core reactor. The same reference numerals are used to indicate corresponding circuit elements in both FIGURE 1 and FIGURE 3. The changes made in FIGURE 3 provide for a greater accuracy in error measurement by the regulating circuit.

A number of circuit components are added to the regulator circuit to facilitate the use of a saturable core reactor 16a as the second reactor in the circuit. A bias circuit for the saturable core reactor 16a includes a bias winding 16b and a resistor 19 connected across a battery 20. One terminal of the battery 20 is connected to the bus 2. The rectifier 21 is added between the reactors 14 and 16. One side of a relatively high impedance resistor 22 is connected between the reactor 14 and the rectifier 21, with the other side connected between the negative terminal of battery 20 and the resistor 19. The rectifier 21 and the resistor 22 limit the current flow through reactor 14 after it saturates during a positive half cycle of the output voltage V. Further, a rectifier 23 is connected between the saturable reactor 16a and the abse 10 of the transistor 9 to limit the voltage developed across the reactor 16a, in conjunction with the input impedance of the transistor 9. Rectifier 23 also prevents excessive reverse voltage from being applied across the base-emitter junction of transistor 9 during negative half cycles of output voltage.

The voltage divider biasing circuit for the reactors 14 and 16a during the negative half cycle of the voltage V has also modified. The anode of the rectifier 18 is connected to the slide wire 24 of a potentiometer 25 to provide an adjustable bias for these reactors. Positive voltage feedback is provided by means of a potentiometer 26 connected between the freewheeling rectifier 8 and a bus 1. Voltage therefrom is coupled through a slide wire 27 and a resistor 28 to one side of the potentiometer 25. A degenerative, transient feedback is developed by means of a potentiometer 29 connected between the generator winding 5 and the bus 1. The slide wire 30 of the potentiometer 29 is connected through a capacitor 31 to the resistor 28.

The operation of the circuit shown in FIGURE 3 is similar to that of the regulating circuit shown in FIGURE 1. During a positive half cycle of the output voltage V, the saturable core reactor 14 is driven toward saturation in the first direction by current flowing through the resistor 13, the saturable reactor 14, and the relatively high impedance resistor 22. At the same time, the battery 20 causes a current flow to the bias winding 16b to excite the core of the saturable reactor 16a to a predetermined energization state. In this embodiment of my invention, the predetermined energization state comprises saturation of the core of the reactor 16a in one direction. The voltage from the battery 20 further causes current to flow through the saturable core reactor 16a, the rectifier 21, and the resistor 22. The relatively small current which flows through the saturable core reactor 14 prior to the saturation of its core cannot cause the rectifier 21 to be reverse biased. Since the rectifier 21 is conducting at this time, the potential at the lower end of the reactor 14 is held near that of the bus 2. After the reactor 14 saturates in the first direction, the current flow therethrough cannot increase appreciably due to the impedance of the resistor 22.

During a succeeding negative half cycle of the output voltage V, the reactor 14 is driven toward saturation in the second direction. Should the saturable reactor 14 saturate in the second direction, the voltage across the reactors 14 and 16a excites the core of the saturable reactor 16a away from the predetermined energization state, or saturation in the one direction, in proportion to the volt-second area of the voltage applied to the reactor 16a. During a subsequent positive half cycle, the battery 20 causes a current to flow through the bias winding 16b, exciting the core of the saturable reactor 16a back toward its predetermined energization state. This causes the saturable reactor 16a to generate a voltage of a polarity which forward biases the rectifier 23 and the base-emitter junction of the transistor 9. Therefore, current flows through the base of the transistor 9, turning on the transistor 9 to shunt gate current away from the gate-cathode junction of the controlled rectifier 3. As explained above with respect to FIGURE 1, the controlled rectifier 3 is not conducting and the generator field winding 5 is not energized for the duration of the current flow through the transistor 9. This current continues to flow until the saturable reactor 16 is saturated in the one direction once again. At this point, saturable reactor 16a ceases to generate voltage and thus ceases to forward bias the base-emitter junction of the transistor 9. Thereafter, the controlled rectifier 3 can conduct to energize the generator field winding 5 for the remaining portion of the half cycle of the output voltage V.

Figure 4:
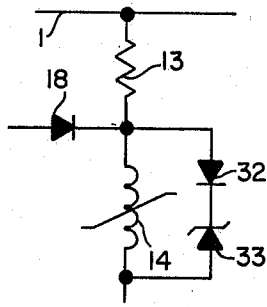
FIGURE 4 shows a modification of my invention wherein a regulating circuit maintains a constant voltage.

In the circuits of FIGURES 1 and 3, the reference quantity is the constant volt-second area that can be supported by reactor 14 in going between positive and negative saturation. Consequently, in those circuits, the regulated output voltage will be maintained constant only so long as the frequency is maintained constant. If the frequency of the generator is changed, the output voltage will vary directly with the change in frequency. FIGURE 4 shows a modification of my invention wherein the regulating circuit can maintain a constant voltage level over a range of frequencies above a predetermined minimum frequency. A rectifier 32 is shown connected in series with a Zener diode 33 across the reactor 14.

The operation of circuits 1 and 3 with this modification included differs from the operation previously described for those circuits. During a positive half cycle of the output voltage V, the saturable reactor 14 is driven toward saturation in the first direction but does not reach saturation in that direction. The positive voltage applied to reactor 14 is limited by the Zener diode 33 to a level at which saturation will not occur for frequencies above a predetermined minimum frequency. As a result, the reference quantity is now a volt-second area inversely proportional to frequency and consequently the output voltage will be held constant and independent of frequency.

Figure 5:
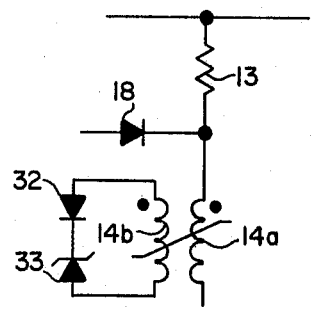
FIGURE 5 depicts another form of the embodiment shown in FIGURE 4.

FIGURE 5 shows a modification of my invention having the same purpose and the same basic end result as the modification shown in FIGURE 4. FIGURE 5 differs from FIGURE 4 in that an additional winding 14b is added on reactor and the original winding is now designated as 14a.

Zener diode 33 and diode 32 are connected across winding 14b. This arrangement permits the use of Zener diodes of different voltage ratings merely by changing the turns ratio between windings 14a and 14b. Thus, a Zener diode of a voltage rating having a low temperature coefficient could be utilized.

This invention is not limited to the particular details of the embodiment illustrated, and it is contemplated that various modifications and applications thereof will occur to those skilled in the art. For example, while the application of the invention described is a regulating circuit, there are many other applications of the two reactor reference-measure combination described. The two reactors and the constant voltage load afforded by transistor 9 and/or series connected diodes have many applications as an amplifier. It is, therefore, intended that the appended claims cover such modifications and applications as not depart from the direct spirit and scope of this invention.

What is claimed as new and desired to be secured by Letters Patent of the United States is:

1. An amplifier comprising
    first and second reactive means;
    energizing means for energizing said first reactive means for a first increased energy storage time period;
    said energizing means causing current to continue to flow in said first reactive means and in said second reactive means during a second time period; and
    constant voltage load means receiving the energy stored by said second reactive means for a third time period;
    the value of said constant voltage determining the ratio of said third time period to said second time period.

2. An amplifier as recited in claim 1 wherein the energizaiton of said first reactive means causes the impedance thereof to decrease substantially at the end of said first time period.

3. An amplifier as recited in claim 2 wherein said second reactive means receives current from said energizing means during said first and second time periods and is responsive thereto only during said second time period when the impedance of said first reactive means is low permitting substantially greater energizing current flow.

4. An amplifier as recited in claim 3 further comprising means including said energizing means for applying an alternating voltage to said first and second reactive means, said first reactive means being energized during alternating voltage half cycles of one polarity and reset to a known energization level during alternating voltage half cycles of the other polarity.

5. An amplifier as recited in claim 4 wherein said first and second time periods occur during said one polarity half cycles of the alternating voltage and said third time period commences with said other polarity half cycles.

6. An amplifier as recited in claim 5 further including means enabled by said other polarity half cycles of alternating voltage to permit said constant voltage load to receive the energy stored by said second reactive means.

7. An angle amplifier comprising
    reactive means;
    means for applying a periodic voltage to said reactive means to energize said reactive means from a first known energy level to a second known energy level during each first half cycle of said periodic voltage;
    said second energy level being reached at a phase angle determined by the amplitude of said periodic voltage;
    measuring means receiving energy from said periodic voltage for a period commencing with said phase angle and terminating with the end of each first half cycle to obtain a measure of said phase angle; and
    constant voltage means receiving the energy stored by said measuring means for a period commencing with the beginning of each second half cycle of said periodic voltage and terminating at a phase angle determined by the value of said constant voltage;
    the value of said constant voltage thereby determining the amplification factor of said amplifier.

8. An angle amplifier as recited in claim 7 wherein said reactive means is driven into saturation by said periodic voltage during each first half cycle and reset to said first known energy level during each second half cycle.

9. A control system comprising
    reference reactive means;
    measuring reactive means;
    means for applying a periodic voltage to said reference reactive means to energize the reference reactive means from a first known energy level to a second known energy level during each first half cycle of the periodic voltage;
    said second energy level being reached at a phase angle determined by the amplitude of said periodic voltage;
    said measuring reactive means receiving the remainder of each first half cycle of the periodic voltage when said reference reactive means reaches said second energy level;

the measure of the energy received by said measuring reactive means being indicative of the deviation of the level of said periodic voltage from the reference level established by said reference reactive means; and constant voltage means responsive during each second half cycle of said periodic voltage to the energy stored by said measuring reactive means to control energization of the device being controlled.

10. A control system as recited in claim 9 wherein said periodic voltage is applied to both the reference and measuring reactive means throughout each first half cycle and said second energy level is the saturation of said reference reactive means permitting effective excitation current to be applied to said measuring reactive means upon said saturation.

11. A circuit for regulating the flow of current through a gate controlled conducting device to a load in response to the voltage level of an alternating-current source comprising, in combination:
(a) the gate controlled conducting device having a gate electrode, means for connecting said gate controlled conducting device to the source and to the load;
(b) a control circuit comprising saturable core reactor means, second reactor means, and current flow responsive means;
(c) means for connecting said control circuit to the source to allow said saturable core reactor to be energized in a first direction to a predetermined energization state during each half cycle of the source voltage of a first polarity, the last mentioned means allowing said saturable core reactor to be energized in a second direction by the source during each half cycle of the source voltage of a second polarity;
(d) means for connecting said second reactor means to said saturable core reactor means to cause said second reactor means to be energized after the core of said saturable core reactor is saturated in the second direction;
(e) means for connecting said current flow responsive means to said second reactor means and to said gate electrode to cause said current flow responsive means to control the firing of said gate controlled conducting device during the next half cycle of the first polarity after said second reactor has been energized.

12. A circuit according to claim 11 wherein said second reactor means requires a larger exciting current to energize it than does said saturable core reactor means so that said second reactor means is substantially unaffected by the source during a half cycle of the second polarity until said saturable core reactor means is saturated in the second direction.

13. A circuit according to claim 11 wherein the predetermined energization state of said saturable core reactor means is saturated in the first direction.

14. A circuit according to claim 11 wherein said second reactor comprises a second saturable core reactor and includes circuit means for driving said second saturable core reactor to a predetermined energization state during a generated voltage half cycle of the first polarity.

15. A voltage regulating circuit comprising, in combination:
(a) an alternating current generator having output terminals and a field winding;
(b) a gate controlled conducting device having a gate electrode, means for connecting said gate controlled conducting device to said output terminals and to said field winding;
(c) a control circuit comprising saturable core reactor means, second reactor means, and current flow responsive means;
(d) means for connecting said control circuit to said output terminals, the last mentioned means allowing said saturable core reactor to be energized in a first direction to a predetermined energization state during each generated voltage half cycle of a first polarity, said last mentioned means allowing said saturable core reactor to be energized in a second direction during each generated voltage half cycle of a second polarity;
(e) means for connecting said second reactor means to said saturable core reactor means to cause said second reactor means to be energized after the core of said saturable reactor is saturated in the second direction;
(f) means for connecting said current flow responsive means to said second reactor means and to said gate electrode to cause said current flow responsive means to control the firing of said gate controlled conducting device during the next half cycle of the first polarity after said second reactor means has been energized.

16. A voltage regulating circuit according to claim 15 wherein said second reactor means requires a larger exciting current to energize it than does said saturable core reactor means so that said second reactor means is substantially unaffected by the generated voltage during a half cycle of the second polarity until said saturable core reactor means is saturated in the second direction.

17. A circuit according to claim 15 wherein the predetermined energization state of said saturable core reactor means is saturated in the first direction.

18. A circuit according to claim 15 wherein said current flow responsive means includes a semiconductor circuit which can maintain a relatively constant voltage across said second reactor as the energy stored therein is dissipated.

19. The circuit according to claim 15 which includes a semiconductor rectifier and resistive means for shunting said reactors during the second half cycle of the generated voltage.

20. A circuit according to claim 15 wherein said second reactor comprises a second saturable core reactor.

21. A circuit according to claim 20 wherein said second saturable core reactor includes a bias winding and circuit means for driving said second saturable core reactor toward saturation in a first direction during a generated voltage half cycle of the first polarity.

22. A circuit according to claim 15 said control circuit includes a Zener diode, means for connecting said Zener diode to said saturable core reactor means to limit said predetermined energization state.

23. A voltage regulating circuit comprising, in combination:
(a) an alternating current generator having output terminals and a field winding;
(b) a semiconductor controlled rectifier having a gate electrode, means including said field winding for connecting said controlled rectifier to said output terminals;
(c) a control circuit comprising saturable core reactor means, second reactor means, and a semiconductor circuit;
(d) means for connecting said saturable core reactor and said second reactor in series across said output terminals, the last mentioned means causing said saturable core reactor to be energized to a predetermined energization state during each generated voltage half cycle of a first polarity, said last mentioned means causing said saturable core reactor to be oppositely energized during each generated voltage half cycle of a second polarity;
(e) means for connecting said semiconductor circuit to a point between said series connected reactors and to said gate electrode of said controlled rectifier to cause the energization state of said second reactor to control the firing of said controlled rectifier during the next half cycle of the first polarity after said seond reactor means has been energized during a half cycle of the second polarity.

24. A voltage regulating circuit according to claim 23 wherein said second reactor means requires a larger exciting current to energize it than does said saturable reactor means so that said second reactor means is substantially unaffected by the generated voltage during a half cycle of the second polarity until said saturable core reactor means is saturated by this generated voltage.

25. A circuit according to claim 23 wherein said second reactor comprises a second saturable core reactor and includes circuit means for driving said second saturable core reactor to saturation during a generated voltage half cycle of the first polarity.

26. A circuit for regulating the AC voltage to a load comprising first and second reactors, means for applying said AC voltage to said reactors, said first reactor being saturated by each half cycle of said AC voltage of one polarity and reset to a predetermined energy level by each half cycle of said AC voltage of the other polarity, a constant voltage load, said second reactor being energized by said AC voltage for the remainder of each half cycle of said one polarity after said first reactor has become saturated, said second reactor releasing its energy through said constant voltage load during the succeeding other polarity half cycle, and switch means coupling said AC voltage to said first-mentioned load, said switch means being triggered into conduction during each half cycle of said AC voltage of the other polarity by the return of said second reactor to its original level of energization.

27. In combination, a controllable switching device, a reactor, first means to apply voltage to said reactor in a first direction for a first time interval indicative of the difference between a first quantity and a reference quantity during which first time interval current increases in said reactor to store energy therein, means including an impedance permitting the continuation of current flow in said reactor through said impedance at the end of said first time interval and continuing for a second time interval which is proportional to the amount of said energy stored in said reactor during said first interval, said switching device responsive to substantial cessation of current flow in said reactor during such second time period to switch, the value of said impedance being dimensioned to provide a desired ratio of the time of duration of the second interval to the time of duration of the first interval.

28. In combination a controllable switching device for applying power from a source of alternating potential to a load, a reactor, means for applying alternating potential from said source to said reactor in a first direction for a first time interval proportional to the departure in amplitude of said alternating potential from a given amplitude during which time interval current increases in said reactor to store electrical energy therein, means including an impedance permitting the continuation of current flow in said reactor through said impedance at the end of said first time interval and continuing for a second time interval which is proportional to the amount of said energy stored in said reactor during said first interval, said switching means responsive to substantial cessation of current flow in said reactor during such second time period to switch on and permit power from said source to be applied to said load.

29. An arrangement according to claim 28 wherein said first-mentioned means comprises a saturable core reactor.

30. An arrangement according to claim 29 wherein said means including an impedance comprises the base to emitter circuit of a transistor, said transistor further comprising a collector electrode, said switching device comprises a silicon controlled rectifier, said silicon controlled rectifier comprising a gate electrode and main current carrying electrodes, means for coupling said gate electrode to the collector electrode of said transistor and its main current carrying electrodes in series between said source and said load.

References Cited

UNITED STATES PATENTS

| | | | |
|---|---|---|---|
| 2,912,602 | 11/1959 | Bownik | 307—106 |
| 3,328,675 | 6/1967 | Samberger et al. | |
| 3,335,291 | 8/1967 | Gutzwiller | 323—40 X |
| 3,351,812 | 11/1967 | Cutler et al. | 322—28 X |

ORIS L. RADER, Primary Examiner

H. HUBERFELD, Assistant Examiner

U.S. Cl. X.R.

330—8; 322—70, 73; 323—4